L. CARLETON.
Subsoil Plow.
No. 108,329. Patented Oct. 18, 1870.
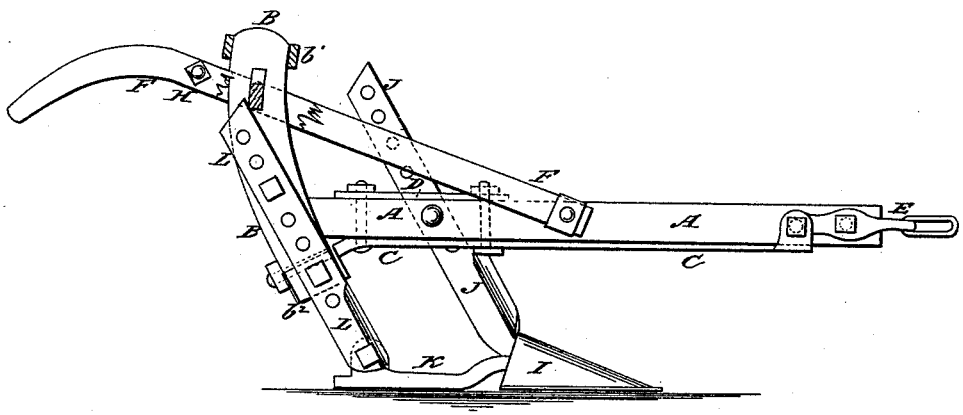
WITNESSES:
INVENTOR:

UNITED STATES PATENT OFFICE.

LEONARD CARLETON, OF POMEROY, OHIO.

IMPROVEMENT IN SUBSOIL-PLOWS.

Specification forming part of Letters Patent No. 108,329, dated October 18, 1870.

*To all whom it may concern:*

Be it known that I, LEONARD CARLETON, of Pomeroy, in the county of Meigs and State of Ohio, have invented a new and useful Improvement in Subsoil-Plows; and I do hereby declare that the following is a full, clear, and exact description thereof, which will enable others skilled in the art to make and use the same, reference being had to the accompanying drawing, forming part of this specification.

The figure is a side view of my improved plow, part being broken away to show the construction.

My invention has for its object to furnish a strong, durable, and effective subsoil-plow, which shall be simple in construction, and easily and quickly adjusted to run at a greater or less depth, as may be desired; and it consists in the construction and combination of the various parts of the plow, as hereinafter more fully described.

A is the plow-beam, to the rear end of which is attached a curved upright, B, which is strengthened at its upper end by a bolt, $b'$, and at its lower end by a band or ferrule, $b^2$.

C is an iron bar, extending along the under side of the beam A, and secured to said beam by two bolts, one upon each side of the mortise through which the forward plow-standard passes, and which also pass through the short iron bar D, placed upon the upper side of the rear part of the said beam A.

Upon the side edges of the forward end of the bar C are formed lugs $c'$, which project up upon the sides of the forward part of the beam A, and have holes formed through them to receive the rear bolt of the clevis E, as shown in the figure. The rear part of the bar C, just in the rear of the rear bolt that secures it to the beam A, is bent forward, or inclined downward, and passes through the lower part of the upright B, where it is secured by a nut screwed upon its rear end.

F are the handles, the forward ends of which are bolted to the middle part of the beam A, and are strengthened and secured against splitting by iron bands passing around three sides of the said ends. The upper parts of the handles F are connected to each other, and to the upper part of the upright B, by the cross-bar G, the ends of which are secured to the said handles, and which passes through a slot in the said upright B, so that the handles may be raised and lowered as desired. The bar G may be secured in place in the slot of the upright B, when adjusted, by a wedge-key placed in said slot above or below said key, as required. The bar G is kept from slipping longitudinally in the upright B by angle-irons attached to said bar, and which rest against the opposite sides of said upright, as shown in dotted lines in the figure. The handles F are also connected to each other, a little in the rear of the cross-bar G, by a long bolt, H.

I is the plow, which is made of a triangular plate bent into about the form of a semi-cone, and with the rear part of its side edges slightly flaring.

J is the forward standard, which passes up through the beam A, and through one or the other of the holes formed through the upper part of said standard. Upon the forward edge of the lower part of the standard J is formed a colter, and its lower end is bent forward to pass beneath the rear part of the plow I, to which it is secured by two bolts.

K is the sole of the plow, the forward part of which is bent upward, to pass beneath the rear part of the plow I, to which it is secured by the same bolts that secure the standard J to said plow. Upon the rear end of the sole K is formed a lug to receive the bolt by which the lower end of the rear standard L is secured to said sole K. Through the upper part of the rear standard, L, is formed a number of holes at the same distance apart as the holes in the forward standard, J, to receive the two bolts, by which it is adjustably secured to the side of the upright B, the upper one of said bolts passing through the middle part of said standard, and the lower one through the lower end of said upright, and through the band $b'$, attached to said end. By this construction the parts I J K L are securely connected with each other, and with the beam and upright, and at the same time in such a way that they may be easily raised and lowered to cause the plow to work shallower or deeper in the ground, as may be desired.

Having thus described my invention, I claim as new and desire to secure by Letters Patent—

The combination, with a subsoil-plow iron, I, of the sole K and the two adjustable standards J L, constructed and relatively arranged as and for the purpose described.

LEONARD CARLETON.

Witnesses:
 D. A. SMITH,
 JIM LYMAN.